United States Patent
Stein et al.

[15] 3,699,343
[45] Oct. 17, 1972

[54] CONDENSATION HEATED BLACK BODY RADIATION SOURCE

[72] Inventors: Bernard Stein, Andover, Mass.; Sheridan Davis, Nashua, N.H.

[73] Assignee: Sanders Associates, Inc., Nashua, N.H.

[22] Filed: Aug. 19, 1969

[21] Appl. No.: 851,203

[52] U.S. Cl. ............................................. 250/85
[51] Int. Cl. ...................................... H05b 11/00
[58] Field of Search ...250/85; 219/341, 326; 165/32, 165/105

[56] References Cited

UNITED STATES PATENTS

| | | | |
|---|---|---|---|
| 2,835,480 | 5/1958 | Perez | 219/326 |
| 2,952,762 | 9/1960 | Williams et al. | 250/85 |
| 3,138,697 | 6/1964 | Banca et al. | 250/85 X |
| 3,229,759 | 1/1966 | Grover | 165/105 |
| 3,275,829 | 9/1966 | McClune et al. | 250/85 |
| 3,402,761 | 9/1968 | Swet | 165/105 X |

Primary Examiner—James W. Lawrence
Assistant Examiner—C. E. Church
Attorney—Louis Etlinger

[57] ABSTRACT

An isothermal black body radiation source comprises a double reentrant radiating cavity disposed within a heat pipe. Wicking material surrounds the outer surface of the radiating cavity and the heat pipe sidewalls. Heat is supplied to the heat pipe by an electrical winding or other suitable heating means, thereby vaporizing a working fluid. The vapors are condensed on the cavity outer walls thereby releasing their latent heat of vaporization and heating the cavity wall to a uniform temperature. The cavity then radiates energy through an exit aperture. In an alternative embodiment the radiating cavity is disposed within a reflux tube.

16 Claims, 2 Drawing Figures

INVENTORS
BERNARD STEIN
SHERIDAN DAVIS

BY Robert Van Epps

AGENT

CONDENSATION HEATED BLACK BODY RADIATION SOURCE

BACKGROUND OF THE INVENTION

1. Field of the Invention

The present invention relates most generally to the field of radiation sources and in particular to a new and novel black body radiation source.

2. Description of the Prior Art

The so-called black body radiation source has become a valuable laboratory instrument used generally in infrared technology. Prior to the present invention black body sources consisted of a cone shaped radiator mounted on a thermal mass heated by conduction. One of the most significant of the problems involved with the use of the prior art black body radiation sources arises from non-uniform heating of the radiating cavity which limits the degree to which the instrument approximates the theoretical black body radiator. The radiation emitted by such sources is of a relatively complex spectrum which does not agree with that theoretically predicted for an isothermal source having a temperature of the average temperature of prior art black body sources. An additional consequence of non-uniform heating is that the prior art radiation sources do not emit radiation such that the exit aperture is a Lambertian radiator. The use of a Lambertian diffusing screen is thus required to produce output radiation which is a predictable function of angle from the axis of the radiating cavity. Although black body cavities having several heater windings have been developed in an attempt to reduce thermal gradients an exact equalization of temperature has not been achieved in the prior art.

OBJECTS AND SUMMARY OF THE INVENTION

It is therefore a primary objective of the present invention to provide a new and novel black body radiation source.

It is another object of the present invention to provide apparatus of the above described character wherein the radiation emitting walls thereof are maintained in a substantially isothermal condition.

It is an additional object of the present invention to provide apparatus of the above described character wherein the radiation emitting walls are heated by condensing vapors of a working fluid.

It is also an object of the present invention to provide apparatus of the above-described character which radiates energy which is a predictable function of angle from the exit aperture plane.

It is a further object of the present invention to provide an improved black body source for operation over temperature ranges of −40° to in excess of 2,000° C.

It is still a further object of the present invention to provide a new and novel black body cavity using heat pipe principles.

It is yet another object of the present invention to provide a new and novel black body cavity using a reflux tube heater.

The foregoing, as well as other objectives of the present invention, are accomplished by providing a radiation cavity defined by a thin heat conducting wall integrally formed as the condenser section of an evacuated evaporative heat transfer chamber. Heat is applied to the evaporator section of the chamber and serves to vaporize a small amount of working fluid within the chamber. The increase in volume due to the phase change creates a minute increase in pressure in the evaporator. This slight pressure produces a flow of the vapors toward the condenser section which is of a lower pressure. In the condenser the vapors contact the cooler reverse or outside walls of the black body cavity, condense, and give up their heat of vaporization to the cavity. In losing heat the vapor volume decreases with an attendant reduction in pressure. Thus, an increased pressure gradient between the condenser and evaporator exists which enhances the vapor flow. The latent heat of vaporization operates to heat the black body cavity to a very uniform temperature thus yielding a radiation output which is in very close agreement with that predicted by radiation theory.

In one embodiment of the present invention a radiating cavity is disposed within a heat pipe. In an alternative form the cavity is disposed within a reflux tube evaporative heat transfer chamber.

DESCRIPTION OF PREFERRED EMBODIMENT

Figure 1:
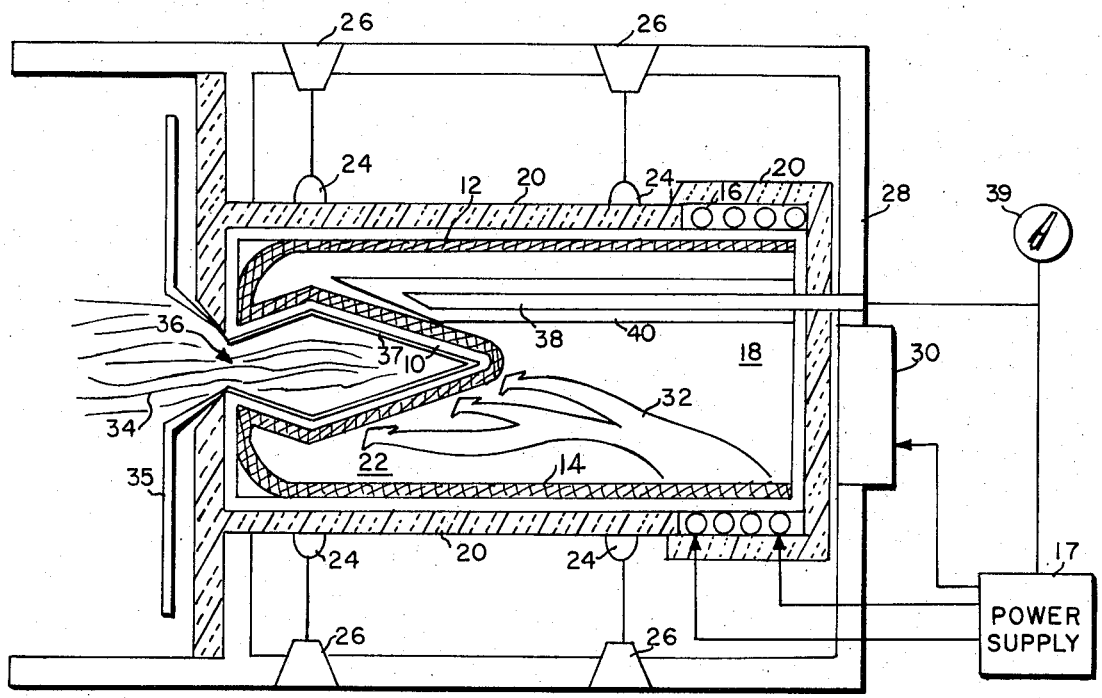
FIG. 1 is a schematic cross section view of an embodiment of the present invention using a heat pipe.

Referring now to FIG. 1, there is schematically illustrated in cross section a condensation heated black body radiation source fabricated in accordance with the principles of the present invention. A radiation cavity 10, such as a double reentrant cone, is formed in one end of a heat pipe 12 and the cone and chamber sidewalls are covered with a suitable wicking material 14. The heat pipe 12 is degassed, then charged with a working fluid (not shown) and sealed. A heating coil 16 is disposed about the evaporator end 18 of the heat pipe 12 and is coupled to a variable power supply 17. A layer 20 of insulation such as asbestos is disposed about the exterior walls of the heat pipe 12, as well as the forward end of the outer case 28, to thereby minimize stray radiation. The black body assembly is then suspended by a series of clamps 24 and brackets 26 in an outer case 28 which may be cooled by an exhaust fan 30, also coupled to the power supply 17.

In operation, heat is applied to the evaporator end 18 of the heat pipe 12 via the heating coil 16. The heat added to the working fluid in the portion of the wick 14 near the coil 16 raises the vapor pressure of the liquid metal working fluid and evaporation results. The increase in volume due to the change in phase of the working fluid creates a minute increase in pressure in the evaporator end 18 of the heat pipe 12. The very slightly pressurized vapor 32 in the evaporator flows toward regions of lower pressure. The condenser is formed by the outside wall of the radiation cavity 10. As the vapors contact the cooler walls of the radiation cavity 10 they condense giving up their latent heat of vaporization. During this change of phase of the working fluid from vapor back to liquid the volume is decreased and a very slight reduction in pressure occurs and vapor flow from the evaporator to the condenser is enhanced. The condensate then returns by capillary pressure through the wick 14 to the evaporator 18, to thereby complete the evaporative heat transfer cycle. The heat from the condensing vapors is transferred through the wick 14 and heats the thin walled radiation cavity 10, resulting in the emission of black body radiation 34 from the exit aperture 36 of the cavity 10. In order to maximize the emissivity of the cavity 10, the radiating walls may be coated with a layer 37 of high temperature, high emissivity paint or oxide. A low emissivity aperture plate 35 of any desired aperture dimension may be placed about the cavity aperture and preferably is spaced from the insulating layer 20 such that air may circulate there-between.

An accurate temperature sensing means is a necessary element of accurate temperature control. Since the heat pipe is essentially isothermal, a temperature sensor 38, place in a well 40 within the heat pipe and near or on the condensing surface of the radiating cavity 10, allows a very accurate temperature measurement to be maintained. In practice, a resistance thermometer or a thermocouple may be used as the sensor and may be coupled to an external temperature indicator 39 or used to complete a temperature control feedback loop.

It is an inherent characteristic of the heat pipe to maintain isothermal conditions within itself. Thus, should a relatively cool spot begin to develop on the surface of the radiation cavity 10, more vapor tends to condense at that spot and the isothermal condition is maintained. The radiation output of the above-described black body source is thus a function only of temperature and the emissivity of the cavity wall material; i.e. a single color temperature, and is not made unduly complicated by local hot and cool spots on the cavity walls as was the case with prior art.

The Applicants have found that a double reentrant 28° cone radiation cavity 10 to be preferable in the practice of the present invention since the ratio of radiating wall area to aperture area is optimized as are internal reflection and overall size. It will be apparent, however, that other cavity configurations, such as a cylinder, cone, sphere, or others of more complex geometry are equally applicable in the practice of the present invention. The cavity walls should be as thin as practical in order to minimize temperature gradients between the outer condensing surface and the inner emitting surface.

The apparatus of FIG. 1 functions safely at pressures between 0.01 and 2.0 atmospheres, however, an operating pressure of 1.0 atmosphere is preferred in order to eliminate the requirement of a pressure vessel chamber. The temperature range of operation is a function of the working fluid properties and of the pressure limitations of the heat pipe materials. The useful life of the apparatus of the present invention is also dependent upon the materials of which it is fabricated. At the higher operating temperatures materials which would normally be compatible with one another may attack one another and spontaneous oxidation occurs with most materials in contact with the atmosphere at temperatures in excess of 1,100° C. Of the available liquid metal working fluids lithium and sodium show the most promise in having relatively high heats of vaporization and relatively wide temperature range as a liquid, however, cesium, bismuth, lead, lead-bismuth, potassium, tin and sodium-potassium may also be useful in the practice of the present invention. For use in a very high temperature; i.e. about 2,000° C., embodiment of the present invention, silver has high potential as a working "fluid". These elements, however, are in general very chemically active and at the elevated temperatures involved such materials as stainless steels, niobium-zirconium alloy, tantalum and molybdenum are the primary containment materials. In one embodiment of the invention actually fabricated by the Applicants, the heat pipe 12 and radiating cavity 10 were fabricated of AISI 304L stainless steel. The wick 14 was formed of six layers of 160 mesh 316 stainless steel welded to the outer surface of the radiating cavity. This wick material is wetted by a sodium working fluid but has a high resistance to its deleterious effects. It will be apparent that the heat pipe must have some internal capillary structure. In this specific embodiment a stainless steel screen was employed, however, other porous forms of wicking material are equally applicable to the practice of the present invention. An alternative approach would involve the use of a fine grooved capillary structure integrally formed in the chamber and cavity walls. The heating coils 16 around the evaporator section may be of any suitable type. Induction coils offer the advantage of operating at temperatures below the evaporator temperature, however, the required power supplies are generally more expensive than resistance heaters.

The same heat pipe principles as discussed above may also be applied to a low temperature radiation standard should such a device be desired. The electrical heating coils of FIG. 1 are merely replaced with a cooling coil coupled to a recirculating cooler filled with a cryogenic fluid such as liquid helium. A working fluid such as liquid nitrogen is placed in the heat transfer chamber and is cycled through the apparatus in a manner which is simply reversed from that described with reference to FIG. 1. The working fluid is evaporated from the outside surface of the cavity, condensed at the cooling coils and returns to the cavity via the wick by capillary pressure. In this manner the cavity walls are maintained at an isothermal cryogenic temperature.

Figure 2:
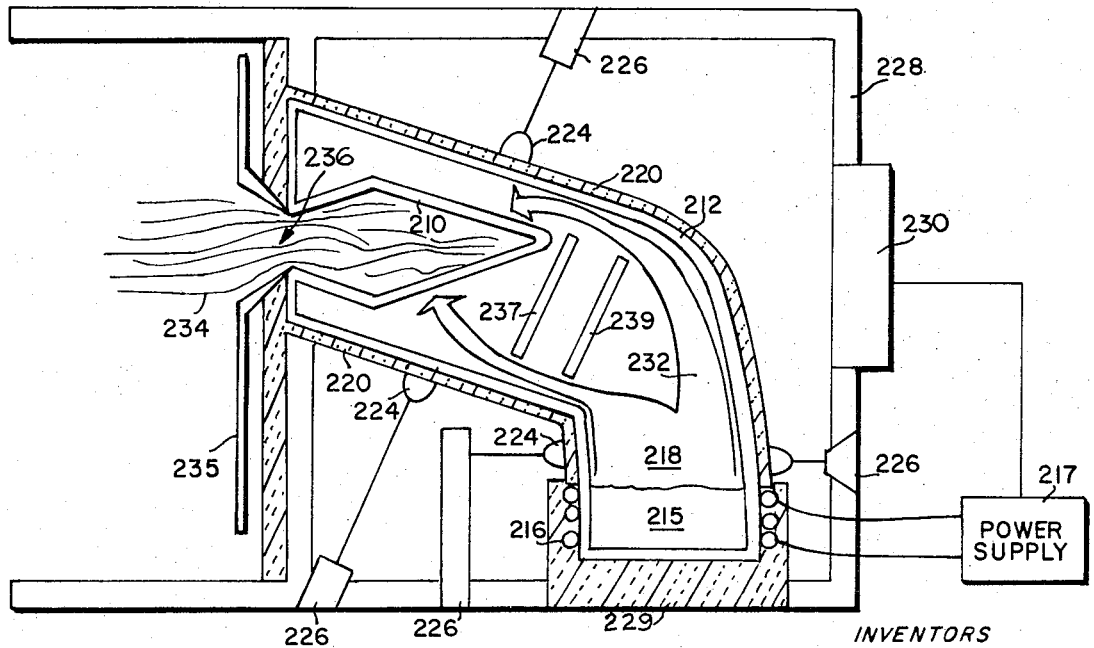
FIG. 2 is a schematic cross section view of an alternative embodiment of the present invention using a reflux tube evaporative heat transfer chamber.

Turning to FIG. 2, there is illustrated in schematic cross section an alternative embodiment of a condensation heated black body radiation source wherein a reflux tube is used as an evaporative heat transfer chamber. In this embodiment a radiation cavity 210 is disposed in the upper end of a reflux tube 212. The tube and the front face of the protective case 228 are insulated with a layer 220 of asbestos or other suitable insulating material. The tube is mounted in case 228 on a layer of insulation 229 and is secured by means of a series of brackets 226 and clamps 224. A low emissivity aperture plate 235 of any desired aperture dimensions may be placed about the exit aperture of the radiation cavity 210. This plate is cooled by convection and substantially eliminates any secondary radiation from the protective case 228. A pool of liquid metal working fluid 215 in the bottom of evaporator section 218 of the tube 212 is heated such as by a coil 216 thereby raising the vapor pressure of the working fluid 215 and producing evaporation. The vapors 232 rise by convection until they contact the cooler walls of the radiation cavity 210 where they condense, giving up their latent heat of vaporization to the cavity walls. This energy is then reradiated as radiation 234 by the cavity walls through the exit aperture 236. Radiation baffles 237 and 239 are placed in the reflux tube 212 to prevent the inside surfaces of the cavity 210 from absorbing direct radiation from the evaporator section 218 and to prevent any sputtered liquid from directly contacting the cavity walls. An exhaust fan 230 may be disposed in the rear of the protective case 228 to preclude unwanted heat build up within the case and may be driven by the same power supply 217 as is used to operate the heating coils 216. A temperature sensor of the same type and installation as shown in FIG. 1 may be used in this embodiment of the invention but is not shown in FIG. 2 for the purpose of clarity.

In both illustrative embodiments of the invention shown in the appended drawings, the temperature uniformity over the radiation cavity walls is very nearly isothermal. This is due to the fact that the heat flows from regions of higher temperature to regions of lower temperature and the heat conduction occurs at a rate which is proportional to the temperature difference. Since large quantities of heat may be transferred over very small temperature differences any thermal gradients which may start to develop on the surface of the radiation cavity will automatically be compensated by an increased heat flow to the relatively cooler area. In the same manner any hot spots which begin to develop will automatically receive a lesser quantity of heat and the substantially isothermal surface is maintained. The isothermal nature of the radiating surface, thus, emits a relatively clean spectrum which fits very closely with that predicted by radiation theory. In addition, since each element of the surface is at the same temperature, the exit aperture closely approximates a true Lambertian radiator and the resulting radiation is also predictable as to its spatial characteristics.

It will thus be seen that the objectives set forth above, among those made apparent from the preceding description are efficiently attained and since certain changes may be made in the above construction without departing from the scope of the invention, it is intended that all matter contained in the foregoing description or shown in the accompanying drawings shall be interpreted as illustrative and not in a limiting sense.

Having described what is new and novel and desired to secure by Letters Patent, what is claimed is:

1. An improved black body radiation source comprising
   an evaporative heat transfer chamber having an evaporator portion and a condenser portion,
   a working fluid disposed within said chamber,
   means for heating the evaporator portion of said chamber to thereby vaporize a portion of said working fluid,
   a radiation cavity having an exit aperture, disposed in the condenser portion of said chamber, and having an outer surface whereon vapors condense thereby heating said cavity to a substantially uniform preselected temperature such that radiation is emitted through said aperture, and
   means for returning the condensate to said evaporator portion of said chamber.

2. Apparatus as recited in claim 1 wherein
said evaporative heat transfer chamber is a heat pipe having a capillary structure disposed about the outer surface of said cavity and the sidewalls of said chamber whereby said condensate is returned from said condenser portion to said evaporator portion by capillary pressure.

3. Apparatus as recited in claim 2 wherein
said capillary structure is a wick formed of a material which is wetted by but nonreactive with said working fluid.

4. Apparatus as recited in claim 3 wherein
said wick is formed of a plurality of layers of stainless steel screen.

5. Apparatus as recited in claim 1 wherein
said evaporative heat transfer chamber is a reflux tube having a condenser portion which is elevated with respect to said evaporator portion whereby said condensate is returned from said condenser portion to said evaporator portion by gravity.

6. Apparatus as recited in claim 5 further including
means disposed within said reflux tube between said evaporator and said condenser for preventing direct contact of said working fluid in the liquid phase with said radiation cavity.

7. Apparatus as recited in claim 1 wherein
said working fluid is a liquid metal.

8. Apparatus as recited in claim 7 wherein
said liquid metal is selected from the group of liquid metals consisting of:
   lithium,
   cesium,
   sodium,
   bismuth,
   lead,
   lead-bismuth
   potassium,
   tin, and
   sodium-potassium.

9. Apparatus as recited in claim 1 wherein
said working fluid is silver.

10. Apparatus as recited in claim 1 further including
a layer of high emissivity material disposed on the inner surface of said radiation cavity.

11. Apparatus as recited in claim 1 further including
a low emissivity aperture plate disposed about said exit aperture of said radiation cavity.

12. Apparatus as recited in claim 1 further including
temperature sensing means disposed proximate the outer surface of said radiation cavity.

13. Apparatus as recited in claim 12 wherein
said temperature sensing means is coupled to and operative to control the output of said heating means.

14. Apparatus as recited in claim 1 further including
means for insulating said condenser portion of said chamber except for said radiation cavity exit aperture to thereby substantially preclude the emission of radiation from any portion of the apparatus except said aperture.

15. Apparatus as recited in claim 1 wherein
said radiation cavity is a double reentrant cone cavity.

16. Apparatus as recited in claim 15 wherein
said double reentrant cone has a divergence of 28°.

* * * * *